(12) United States Patent
Natarajan

(10) Patent No.: US 8,467,532 B2
(45) Date of Patent: *Jun. 18, 2013

(54) SYSTEM AND METHOD FOR SECURE TRANSACTION OF DATA BETWEEN A WIRELESS COMMUNICATION DEVICE AND A SERVER

(75) Inventor: Vijayarangan Natarajan, Chennai (IN)

(73) Assignee: Tata Consultancy Services Limited, Mumbai (IN)

(*) Notice: Subject to any disclaimer, the term of this patent is extended or adjusted under 35 U.S.C. 154(b) by 238 days.

This patent is subject to a terminal disclaimer.

(21) Appl. No.: 12/967,129

(22) Filed: Dec. 14, 2010

(65) Prior Publication Data

US 2011/0164749 A1 Jul. 7, 2011

(30) Foreign Application Priority Data

Jan. 4, 2010 (IN) .......................... 0010/MUM/2010

(51) Int. Cl.
*H04L 9/00* (2006.01)
*H04L 9/08* (2006.01)
(52) U.S. Cl.
USPC ............ 380/274; 380/260; 380/262; 380/268
(58) Field of Classification Search
USPC ................... 713/171; 380/260, 262, 268, 274
See application file for complete search history.

(56) References Cited

U.S. PATENT DOCUMENTS

| 7,398,550 | B2 | 7/2008 | Zick et al. | |
|---|---|---|---|---|
| 7,448,068 | B2 | 11/2008 | Sun et al. | |
| 7,626,963 | B2 | 12/2009 | Patel et al. | |
| 2002/0002076 | A1* | 1/2002 | Schneier et al. | 463/29 |
| 2006/0168253 | A1* | 7/2006 | Baba et al. | 709/229 |
| 2008/0313464 | A1* | 12/2008 | Fascenda et al. | 713/171 |
| 2009/0193247 | A1 | 7/2009 | Kiester et al. | |
| 2011/0075840 | A1* | 3/2011 | Zayas et al. | 380/46 |

OTHER PUBLICATIONS

Aboba et al., Extensible Authentication Protocol (EAP), Network Working Group, The Internet Society, Jun. 2004.
Bersani et al The EAP-PSK Protocol: A Pre-Shared Key Extensile Authentication Protocal (EAP) Method, Network Working Group, The IETF Trust, Jan. 2007.
Cisco Leap, Cisco Systems, Inc., 2005.

* cited by examiner

*Primary Examiner* — Mohammad W Reza
(74) *Attorney, Agent, or Firm* — Akerman Senterfitt; Peter A. Chiabotti; Roy Zachariah

(57) ABSTRACT

The present invention provides a system and method for a set of Extensible Authentication Protocols (EAPs) that can serve Confidentiality, Authentication, Authorization and Accounting (CAAA) issues at an affordable cost. According to one embodiment of the invention, a system and method is provided to generate random sequences (through prime numbers) which can be used in the authentication process of certificateless extensible authentication protocols (EAPs) for mobile and wireless communications. The invention also provides a light weight security with better performance in comparison to the lower layer chip level security provided by 2G, 3G or 4G applications.

20 Claims, 7 Drawing Sheets

SYSTEM AND METHOD FOR SECURE TRANSACTION OF DATA BETWEEN A WIRELESS COMMUNICATION DEVICE AND A SERVER

CROSS REFERENCE TO RELATED APPLICATION

This application claims the benefits of Indian Provisional Patent Application No. 0010/MUM/2010, filed on Jan. 4, 2010, the contents of which are hereby incorporated by reference in its entirety.

FIELD OF THE INVENTION

The present invention relates to the field of mobile and wireless communications. More particularly, the invention relates to a system and method for secure transaction of data between at least one wireless communication device and a server by using lightweight Extensible Authentication Protocols (EAPs) based on the random sequences.

BACKGROUND OF THE INVENTION

In the mobile and wireless communication, Authentication methods are generally used to gain network access. The communication server (either for mobile or wireless), which provides accessibility, must have a set of processes and protocols to verify user's identity. There is a need of a standard way for verifying user's logon, monitoring user's network usage and customer billing. Currently there are standards and protocols that can fulfill the above criteria for Authentication, Authorization and Accounting (AAA) purposes. But some of them are not secured and their performance will not meet 3G mobile communication requirements.

However, the current mobile and wireless authentication mechanisms employ the usage of Certificates. The Authorization protocols must support some notion of a "charging certificate". These Certificates being heavy weight in size affect the performance of the Mobile Application. With the conservative standards set by many Institutions chiefly in the mobile banking sector there is a requirement for light weight protocols which help in ensuring optimum performance of mobile applications through wireless media.

Moreover, mobile and wireless devices, like smart phones, PDAs, cellular phones and remote control systems, play an increasingly important role in the digital environment. The pervasive use of mobile and wireless devices brings new security and privacy risks and with the extensive use of mobile devices consumers continuously leave traces of their identities and transactions, sometimes even by just carrying the devices around in their pockets. Since providing true privacy is hard as hiding identity information is irrelevant as long as some other linkable information is associated with the messages, the usage of a light weight protocol will help provide effective solutions to a majority of mobile and wireless applications.

Some of the inventions which deal with providing systems and methods for secure transaction of data between at least one wireless communication device and a server are:

United States Patent Application No. 20090193247 by Kiester et al. discloses that methods and apparatus which provide tunneling one authentication framework over a more widely accepted framework (e.g., EAP). In this manner, pluralities of strong authentication protocols are wirelessly enabled between a supplicant and server that are not otherwise wirelessly enabled. During use, packets are wirelessly transmitted and received between the supplicant and server according to EAP's prescribed message format, including a wireless access point. In a tunnel, various authentication protocols form the payload component of the message format which yields execution capability of more than one protocol, instead of the typical single protocol authentication. Certain tunneled frameworks include NMAS, LDAP/SASL, Open LDAP/SLAPD, or IPSEC. Computer program products, computing systems and various interactions between the supplicant and server are also disclosed.

U.S. Pat. No. 7,626,963 by Patel et al. discloses that methods and apparatus for dynamically generating a set of Mobile IP keys. The set of Mobile IP keys is dynamically generated using an existing HLR/AuC authentication infrastructure. This is accomplished, in part, by obtaining an International Mobile Subscriber Identity (IMSI) that uniquely identifies a particular Mobile Node. Once a set of Mobile IP keys is generated from authentication information associated with the IMSI, the Mobile Node may register with its Home Agent using the set of Mobile IP keys.

U.S. Pat. No. 7,398,550 by Zick et al. discloses that Enhanced Secret Shared Provisioning Protocol (ESSPP) which provides a novel method and system for adding devices to a network in a secure manner. A registration process is launched at two network devices together within a predetermined time interval. These two devices then automatically register with each other. When two devices running ESSPP detect each other, they exchange identities and establish a key that can later be used by the devices to mutually authenticate each other and generate session encryption keys. With ESSPP, two ESSPP devices that are attempting to register with each other will only provision a key when they detect that they are the only two ESSPP devices on the wireless network running ESSPP. If additional devices running ESSPP are detected, the ESSPP protocol is either terminated or suspended.

U.S. Pat. No. 7,448,068 by Sun et al. discloses automatic client authentication for a wireless network protected by PEAP, EAP-TLS or other extensible authentication protocols. The user doesn't have to understand the difference between the protocols in order to connect to the network. A default authentication protocol is automatically attempted. If not successful, then the authentication switches over to another authentication method if the network requests it.

Network Working Group, Request for Comments: 3748 {RFC 3748}, Extensible Authentication Protocol (EAP), by Aboba et al. discloses that EAP is authentication framework for wireless networks and point-to-point connections.

Network Working Group, Request for Comments: 4764 {RFC 4764}, the EAP-PSK Protocol: A Pre-Shared Key Extensible Authentication Protocol (EAP) Method, by Bersani et al. discloses that it provides a protected communication channel when mutual authentication is successful for both parties to communicate over.

Cisco systems developed Lightweight Extensible Authentication protocol (LEAP). It is a proprietary EAP method. There is no native support for LEAP in any Windows operating system but is supported by third party supplicants. The protocol is known to be vulnerable to dictionary attacks. However, Cisco still maintains that LEAP can be secure if sufficiently complex passwords are used.

None of the above mentioned prior arts provide a system and method for a lightweight and high speed certificateless extensible authentication protocols (EAPs), which occupy less memory space for storage, for mobile and wireless communications and also provide EAPs which are suitable for wireless communication devices enabled with 2G, 3G or 4G networks.

Thus, in the light of the above mentioned prior art, it is evident that, there is a need to system and method which: Solves Confidentiality, Authentication, Authorization and Accounting (CAAA) issues for mobile phones and wireless devices at an affordable cost; Provides a certificate-less extensible authentication protocols (EAPs) for mobile and wireless communications; Provides two way authentication in comparison to the current one way authentication standards; and Provides extensible authentication protocols (EAPs) based on the random sequences which are easy to deploy on existing wireless communication devices.

SUMMARY OF THE INVENTION

Before the present methods, and systems enablement are described, it is to be understood that this invention in not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention which will be limited only by the appended claims.

The primary object of the invention is to provide a system and method for a set of Extensible Authentication Protocols (EAPs) that can serve Confidentiality, Authentication, Authorization and Accounting (CAAA) issues at an affordable cost.

It is another object of the invention to provide a system and method for generating random sequences (through prime numbers) which can be used in the authentication process of extensible authentication protocols (EAPs) for mobile and wireless communications.

It is another object of the invention to provide a system and method for generating random sequences which can avoid replay attacks.

It is another object of the invention to provide a certificate-less extensible authentication protocols (EAPs) for mobile and wireless communications.

It is another object of the invention to provide a securely transfer of registry and provision of consumer details over the communication network.

It is another object of the invention to provide a light weight security with better performance in comparison to the lower layer chip level security provided by 2G, 3G or 4G applications.

It is another object of the invention to provide a provision of two way authentication in comparison to the current one way authentication standards.

The present invention provides a system and method for a set of Extensible Authentication Protocols (EAPs) that can serve Confidentiality, Authentication, Authorization and Accounting (CAAA) issues at an affordable cost. According to one embodiment of the invention, a system and method generate random sequences (through prime numbers) which can be used in the authentication process of certificateless extensible authentication protocols (EAPs) for mobile and wireless communications.

A method comprising receiving, from a wireless communication device, a connection attempt to access a server; performing an authentication process using lightweight Extensible Authentication Protocols(EAPs) based on the random sequences to facilitate the wireless communication device prior to being allowed access to the server, wherein the said authentication process comprising the steps of: Sending client hello message by the wireless communication device to initiate the communication to the Server; generating a random number after receiving client hello message by the server and subsequently encrypting a message with the generated random number using hash function through a pre-shared private key of the wireless communication device and sending an encrypted message to the wireless communication device by the server; Decrypting the encrypted message by matching hash function through the pre-shared private key of the wireless communication device and subsequently retrieving the random number by the wireless communication device; generating two new random numbers as catalysts to Deterministic Random Sequence Generation (DRSG) process and subsequently generating two new sequences from the above said two new random numbers, and the above said retrieved random number using DRSG algorithm by the wireless communication device, encrypting a message with above said generated two sequences by matching hash function through a new session key of the wireless communication device, and sending encrypted message to the Server by the wireless communication device; computing the above said two sequences and the new sequence from the above said two new random numbers and the retrieved random number using DRSG algorithm, subsequently decrypting the above said two new random numbers using a new computed session key of the wireless communication device, checking the hash value of above said two new sequences and the resultant sequence and validating the protocol by the server, wherein the computed value of the session key is generated from DRSG algorithm; and Sending the response after validating the protocol to the wireless communication device by the server.

In yet another embodiment, this invention provides a method of authenticating a wireless communication device, comprising the steps of: transmitting to a communication device a first message from a server; generating at the server a first random number at the server; generating a first encrypted signal at the server using a second message and the first random number; transmitting the first encrypted signal from the server to the communication device; decrypted the first encrypted signal at the communication device; retrieving the first random number at the communication device; generating at least two new random number at the communication device; generating a second signal using the two random number strings at the communication device using the two new random numbers and the first random number; encrypting the second signal at the communication device; transmitting the second signal from the communication device to the server; decrypting the second signal at the server using a Deterministic Random Sequence Generation (DSRG) process; validating the second signal using a hash value comparison at the server; generating a response based on the hash value comparison at the server; and transmitting the response to the communication device by the server.

In yet another embodiment, the present invention provides a system of authenticating a wireless communication device, comprising: a server configured to generate a first random number; a first encryption module at the server, the first encryption module configured to generate a first encrypted signal using the first random number; a communication device configured to receive the first encrypted signal from the server; a decryption module at the communication device, the decryption module configured to decrypt the first encrypted signal and retrieve the first random number; a random number generator at the communication device configured to generate at least two new random numbers; a second encryption module at the communication device, the second encryption module configured to generate a second signal using the two new random numbers and the first random number; a transceiver at the communication device, the transceiver configured to transmit the second signal from the communication device to the server; a second decryption module at the server, the second decryption module configured to decrypt the second signal using a Deterministic Random Sequence Generation (DSRG) process; and a validation module at the server, the validation module configured to validate the second signal using a hash value comparison.

The invention also provides a light weight security with better performance in comparison to the lower layer chip level security provided by 2G, 3G or 4G applications.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings example constructions of the invention; however, the invention is not limited to the specific methods and system disclosed. In the drawings.

DETAILED DESCRIPTION OF THE INVENTION

Figure 1:
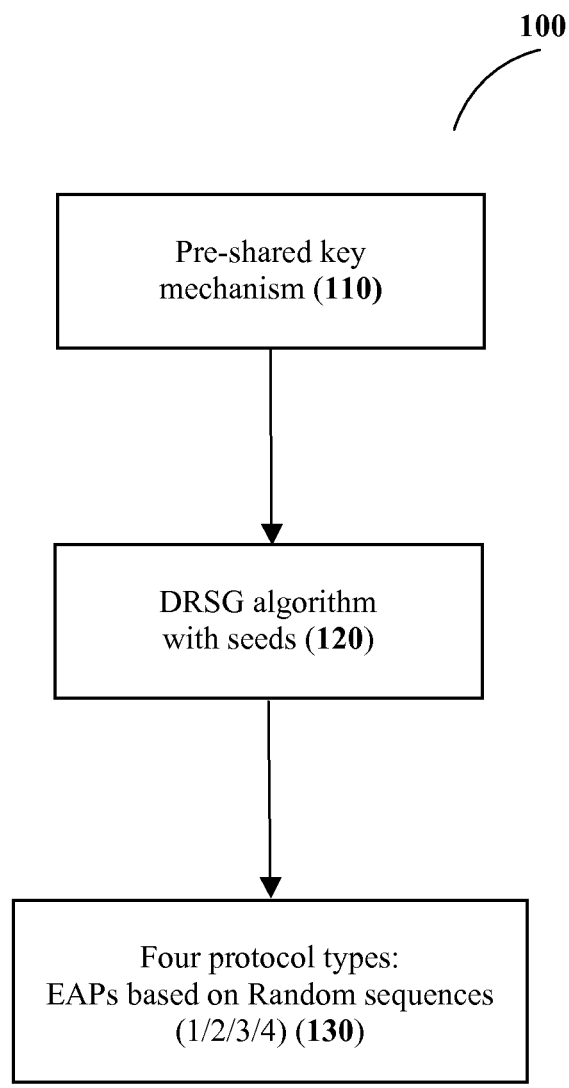
FIG. 1 illustrates the concept diagram on different types of authentication protocols which are used in mobile and wireless communications according to various embodiments of the invention.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

The Extensible Authentication Protocol (EAP) is an Internet standard that provides an infrastructure for network access clients and authentication servers (RFC 3748). It has applications in wireless networks and PPP connections. EAP does not specify the authentication mechanism itself but the way it is negotiated by the communicating parties. There are attacks due to no proper authentication protocols in EAP.

Accordingly, the present invention provides a system and method for a set of Extensible Authentication Protocols (EAPs) that can serve Confidentiality, Authentication, Authorization and Accounting (CAAA) issues at an affordable cost.

A method comprising receiving, from a wireless communication device, a connection attempt to access a server; performing an authentication process using lightweight Extensible Authentication Protocols (EAPs) based on the random sequences to facilitate the wireless communication device prior to being allowed access to the server, wherein the said authentication process comprising the steps of: sending client hello message by the wireless communication device to initiate the communication to the server; generating a random number after receiving client hello message by the server and subsequently encrypting a message with the generated random number using hash function through a pre-shared private key of the wireless communication device and sending an encrypted message to the wireless communication device by the server; Decrypting the encrypted message by matching hash function through the pre-shared private key of the wireless communication device and subsequently retrieving the random number by the wireless communication device; generating two new random numbers as catalysts to Deterministic Random Sequence Generation (DRSG) process and subsequently generating two new sequences from the above said two new random numbers, and the above said retrieved random number using DRSG algorithm by the wireless communication device, encrypting a message with above said generated two sequences by matching hash function through a new session key of the wireless communication device, and sending encrypted message to the Server by the wireless communication device; computing the above said two sequences and the new sequence from the above said two new random numbers and the retrieved random number using DRSG algorithm, subsequently decrypting the above said two new random numbers using a new computed session key of the wireless communication device, checking the hash value of above said two new sequences and the resultant sequence and validating the protocol by the server, wherein the computed value of the session key is generated from DRSG algorithm; and Sending the response after validating the protocol to the wireless communication device by the server.

Figure 2:
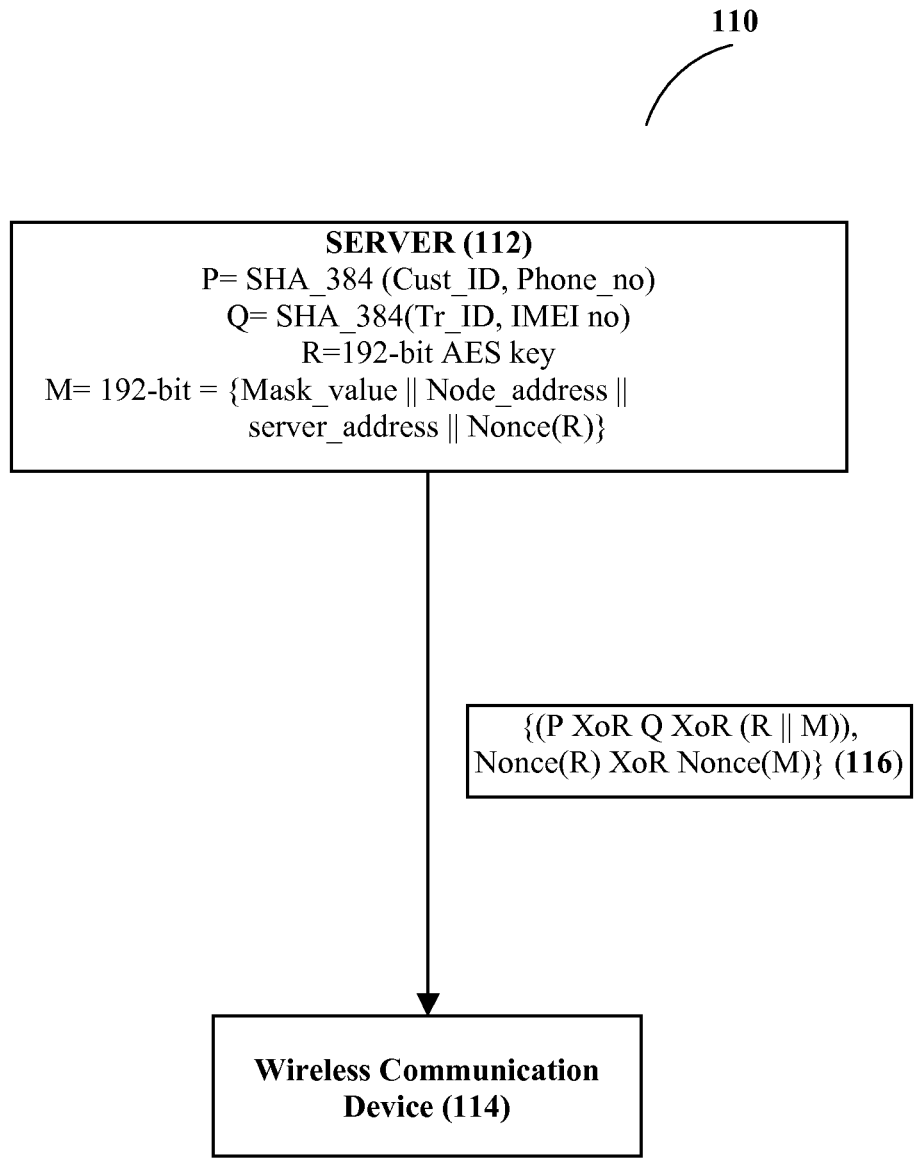
FIG. 2 illustrates the pre-shared key mechanism according to one embodiment of the invention.

FIG. 1 illustrates the concept diagram on different types of authentication protocols which are used in mobile and wireless communications according to various embodiments of the invention. The method 100 comprises a pre-shared key mechanism 110, Deterministic Random Sequence Generation (DRSG) algorithm with seeds 120 and Extensible Authentication Protocols (EAPs) based on Random sequences (1/2/3/4) 130. In the first step, the pre-shared key mechanism 110 is as shown in FIG. 2, the said pre-shared key mechanism takes place between a server 112 and at least one wireless communication device 114. The said server 112 and wireless communication device 114 are communicatively coupled with each other via communication network; the communication network can be selected from the group of Wide area network (WAN), Local Area Network (LAN) or Metropolitan Area Networks (MAN), internet, intranet, etc and the wireless communication device 114 can be selected from one of the group of mobile handsets, smart phones, PDAs, cellular phones, or tiny devices and the wireless communication device enabled with 2G, 3G, or 4G networks.

According to one exemplary embodiment of the invention, the wireless communication device 114 can be mobile phone. The simple, secure and speedy pre-shared key mechanism/process 110 is as described below:

Before pre-shared key mechanism/process 110, the server 112 initially distributes customer identity (Cust_ID) and transaction identity (Tr_ID) to each wireless communication device 114 whose phone and IMEI numbers are used in the transmission. Wherein 1. P=SHA_384 (Cust_ID, Phone_no)
2. Q=SHA_384(Tr_ID, IMEI no)
3. R=a 192-bit AES key
4. M=a 192-bit=Mask_value||Node_address||server_address||Nonce(R)

Initially the server 112 computes and sends computed value {(P XoR Q XoR (R||M)), Nonce(R) XoR Nonce(M)} 116 to a wireless communication device 114 who can use P and Q to get back R.

In next step, the DSRG algorithm/process/method 120 uses seed in the EAPs to generate random number for authentication purpose. It uses forward difference operator/linear operator applied on a collection of random numbers (chosen by system and method of the invention) to generate a random sequence.

In the final step, there are four Extensible Authentication Protocols based on the random sequences 130 described below that will fulfill CAAA issues for mobile and wireless communications. All the above said protocols 130 are based on certificateless concept. The above described method can also be extended to key exchange mechanism between wireless communication device 114 and server 112. Then the server sends different keys to users at every time.

Figure 3:
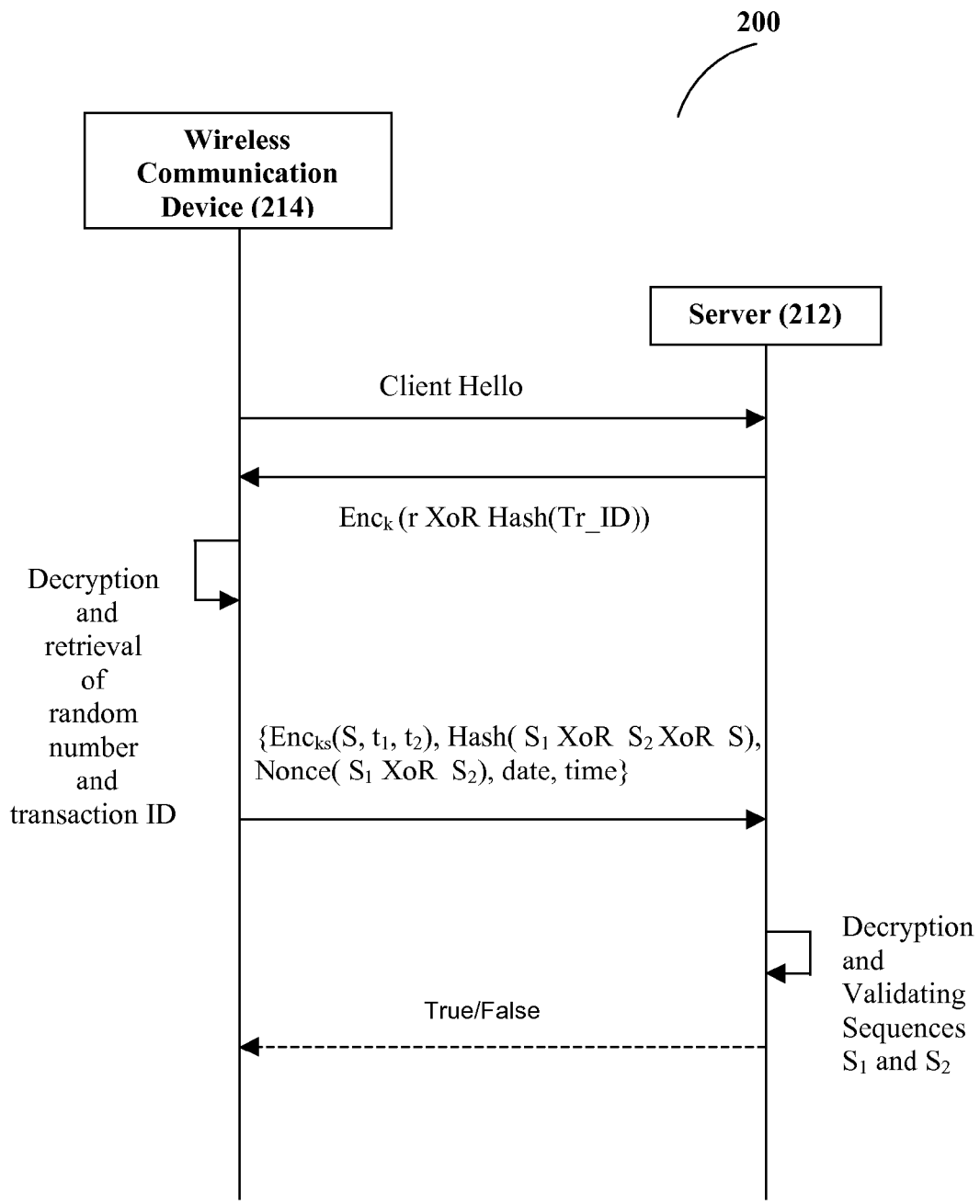
FIG. 3 illustrates the secure transaction of data using EAP Protocol based on Random sequence-1 between server and wireless communication device according to one embodiment of the invention.

FIG. 3 illustrates the secure transaction of data using EAP Protocol based on Random sequence-1 between server and wireless communication device according to one embodiment of the invention. A system 200 comprises a server 212 and a wireless communication device 214 are communicatively coupled with each other via communication network; the communication network can be selected from the group of Wide area network (WAN), Local Area Network (LAN) or Metropolitan Area Networks (MAN), internet, intranet, etc and the wireless communication device 214 can be selected from one of the group of mobile handsets, smart phones, PDAs, cellular phones, or tiny devices and the wireless communication device enabled with 2G, 3G, or 4G networks. According to one exemplary embodiment of the invention, the wireless communication device 214 can be mobile phone.

A method of communication used in the above said system 200 comprising receiving, from at least one wireless communication device 214, a connection attempt to access a server 212; performing an authentication process using lightweight Extensible Authentication Protocol (EAP) based on the random sequences to facilitate the wireless communication device 214 prior to being allowed access to the server 212, wherein the said authentication process comprising the following steps:

In the first step, the wireless communication device 214 initiating the communication by sending client hello message to the server 212, wherein the client hello message includes a list of encryption algorithms that the wireless communication device 214 is prepared to use and some challenge data to be used to authenticate the server 212. The message contains the following fields:

TABLE 1

| CLIENT HELLO MESSAGE | |
| --- | --- |
| Field | Length |
| The message type (client hello) | 8 bits |
| The SSL version number (currently 2) | 16 bits |
| The length of the cipher list | 16 bits |
| The length of the session identifier | 16 bits |
| The length of the challenge data | 16 bits |
| The cipher list | variable |
| The session identifier | 16 ≦ data ≦ 32 bytes |
| The challenge data | variable |

The session identifier is used to match the current request with a previous one, avoiding the need for repeated authenticate and key exchange if two systems have frequent communication. When keys are selected the server 212 will cache these and, if the wireless communication device 214 provides a session identifier in the client hello message the server 212 will search the cache for this session identifier. According to one exemplary embodiment of the invention, the message contains the above mentioned fields as well as additionally 'buffer memory' field having the length of 32 bits. The field and length of the client hello message can be varied based on the requirements.

In the second step, the server 212 generating a random number 'r' after receiving client hello message, according to one exemplary embodiment of the invention, the size of the random number 'r' can be 256-bit and subsequently the server 212 encrypting a message with the generated random number 'r' (preferably 256-bit random number) using hash function through a pre-shared private key 'k' of the wireless communication device 214 and the server 212 sending the encrypted message {y=Enck (r XoR Hash(Tr_ID))} to the wireless communication device 214.

In the third step, the wireless communication device 214 decrypting the encrypted message by matching hash function [Hash (Tr_ID) XoR Deck(y)] through the pre-shared private key 'k' of the wireless communication device 214 and subsequently the wireless communication device 214 retrieving the random number 'r' (preferably 256-bit random number) after receiving the encrypted message from the sever 212.

In the fourth step, the wireless communication device 214 generating two new random numbers t1 and t2 respectively, (according to one exemplary embodiment of the invention, preferably the range 7 bits), as catalysts to Deterministic Random Sequence Generation (DRSG) process and subsequently the wireless communication device 214 generating two new sequences S1 & S2 from the above said two new random numbers t1 and t2, and the above said retrieved random number "r" using DRSG algorithm {DRSG (r, t1, t2)}, then the wireless communication device 214 encrypting a message {Encks (S, t1, t2), Hash(S1 XoR S2 XoR S), Nonce (S1 XoR S2), date, time} with above said generated two sequences S1 & S2 by matching hash function through a new session key "K" of the wireless communication device 214 and then the wireless communication device 214 sending encrypted message {Encks (S, t1, t2), Hash(S1 XoR S2 XoR S), Nonce (S1 XoR S2), date, time} to the Server 212.

In the fifth step, the server 212 computing the above said two sequences S1 & S2 and the new sequence S from the above said two new random numbers t1 & t2 and the retrieved random number 'r' using DRSG algorithm {DRSG (r, t1, t2)} with date and time, subsequently the server 212 decrypting the above said two new random numbers t1 & t2 using a new computed value of session key 'Ks' value, checking the hash value of above said two new sequences S1 & S2 and the resultant sequence S {S1 XoR S2 XoR S } and validating the protocol, wherein the computed value of the session key 'Ks' is generated from DRSG algorithm {DRSG (r, t1, t2)} and In the final step, the server 212 sending the response after validating the protocol to the wireless communication device 214. If the response is 'true" then the secure transaction of data process starts between the wireless communication device 214 and the server 212, otherwise, the response is 'false", the communication ends between them.

According to one embodiment of the invention, the wireless communication device 214 computing the above said value of the session key 'Ks" using DRSG algorithm and the value of one of the random number t1 is less than the value of the second random number t2, said DRSG algorithm/process/method comprising the steps of:

In the first step, DSRG process generating 128 distinct random 64-bit numbers which are used as seed values along with the value of the retrieved random number 'r', optionally the personnel information used as seeds, according to one exemplary embodiment of the invention, the wireless communication device can be mobile, then the personnel information can be Cust_ID, Mobile no, SIM card no, etc.

In the second step, DSRG process applying forward difference operator the value of order (t1 times) of the first random number t1 on a set of seeds and finding a new first sequence S1, In third step, DSRG process repeating the second step for second random number t2 and finding a second new sequence S2.

In the fourth step, DRSG process finding a new resultant 192 bit number {S=sum of first 32 distinct random 40-bit numbers||sum of second 32 distinct random 40-bit numbers||sum of third 32 distinct random 40-bit numbers||sum of fourth 32 distinct random 40-bit numbers=a 45-bit number||a 45-bit number||a 45-bit number||a 45-bit number=a 192-bit number}; and in the final step, DSRG process computing a new computed session key 'Ks' {ks=k XoR (S||Tr_ID)=a 192-bit number} using the generated new resultant 192 bit number S and a session key K.

Before initiating the communication in the above said system 200, initially, the server 212 registers the device and IMEI numbers of the wireless communication device 214 and then distributing customer identity and transaction identity (Cust_ID and Tr_ID) to each wireless communication devices 214 prior to being allowed access to the server 212. According to one exemplary embodiment of the invention, the wireless communication device 214 can be mobile phone, so the server 214 registers mobile and IMEI numbers and distributes customer identity and transaction identity (Cust_ID and Tr_ID) to each mobiles 214 prior to being allowed access to the server 212 and subsequently the server 212 sends 192-bit pre-shared encryption key 'k' using AES-CTR or AES-CBC algorithm to the wireless communication device 214 prior to being allowed access to the server 212 and a known Pseudo Random Number Generator (PRNG) which accepts a seed for generating the random numbers.

According to one embodiment of the invention, the hash function is matched, in the above mentioned system and method, in order to maintain a secure communication to avoid phishing and replay attacks and according to another embodiment of the invention, the nonce value is added, in the above mentioned system and method, in order to maintain a secure communication to avoid phishing and replay attacks. Further, hashing and nonce methods are used to avoid Initial Counter Prediction and Time Memory Trade Off attacks.

Advantages of EAP Protocol Based on Random Sequence-1

1. Reply attack is avoided due to random integers generated by the server
2. It is computationally difficult for an attacker to find the value (S1 XoR S2 XoR S) with the knowledge of t1 and t2 if a client key 'ks' is compromised
3. Client generates ks (a 192-bit key) every time with the help of DRSG process
4. It is computationally difficult to find the values k and S from the key ks.
5. Using linear operators in this protocol, it is difficult to determine the original sequence having 128 distinct random numbers of each size 40-bits with some personnel information. Therefore, it is difficult for an attacker to tamper the message during transmission. The attacker must settle for a 2-8 chance of success.
6. The proposed protocols are compatible with 2G, 3G or 4G mobile networks.
7. This protocol is lightweight when compared to PKI approach.

Figure 4:
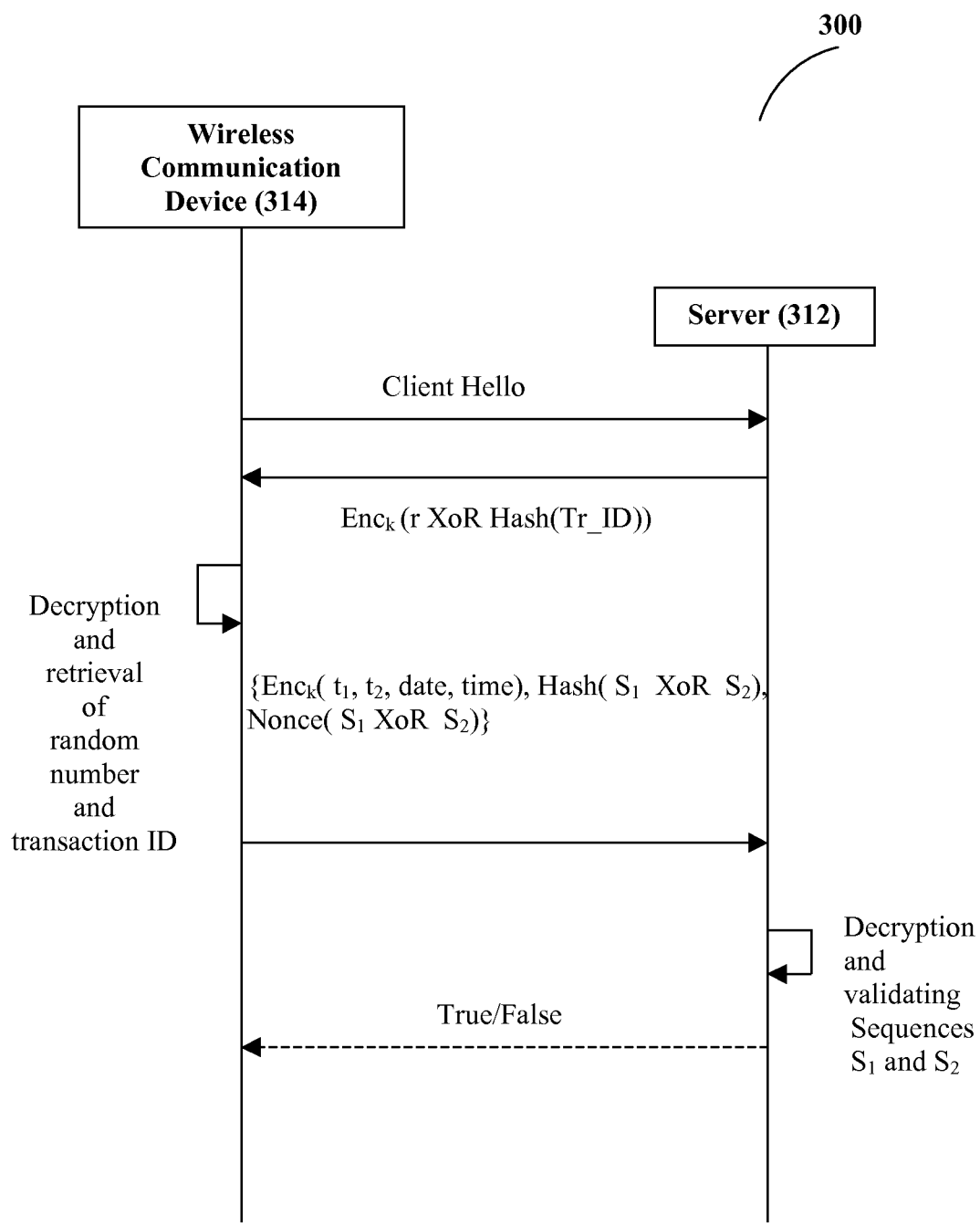
FIG. 4 illustrates the secure transaction of data using EAP Protocol based on Random sequence-2 between server and wireless communication device according to one embodiment of the invention.

FIG. 4 illustrates the secure transaction of data using EAP Protocol based on Random sequence-2 between server and wireless communication device according to one embodiment of the invention. A system 300 comprises a server 312 and a wireless communication device 314 are communicatively coupled with each other via communication network; the communication network can be selected from the group of Wide area network (WAN), Local Area Network (LAN) or Metropolitan Area Networks (MAN), internet, intranet, etc and the wireless communication device 314 can be selected from one of the group of mobile handsets, smart phones, PDAs, cellular phones, or tiny devices and the wireless communication device enabled with 2G, 3G, or 4G networks. According to one exemplary embodiment of the invention, the wireless communication device 314 can be mobile phone.

A method of communication used in the above said system 300 comprising receiving, from at least one wireless communication device 314, a connection attempt to access a server 312; performing an authentication process using lightweight Extensible Authentication Protocol (EAP) based on the random sequences to facilitate the wireless communication device 314 prior to being allowed access to the server 312, wherein the said authentication process comprising the following steps:

In the first step, the wireless communication device 314 initiating the communication by sending client hello message to the server 312, wherein the client hello message includes a list of encryption algorithms that the wireless communication device 314 is prepared to use and some challenge data to be used to authenticate the server 312. The message contains the following fields:

TABLE 2

CLIENT HELLO MESSAGE

| Field | Length |
|---|---|
| The message type (client hello) | 8 bits |
| The SSL version number (currently 2) | 16 bits |
| The length of the cipher list | 16 bits |
| The length of the session identifier | 16 bits |
| The length of the challenge data | 16 bits |
| The cipher list | variable |

TABLE 2-continued

CLIENT HELLO MESSAGE

| Field | Length |
| --- | --- |
| The session identifier | 16 ≦ data ≦ 32 bytes |
| The challenge data | variable |

The session identifier is used to match the current request with a previous one, avoiding the need for repeated authenticate and key exchange if two systems have frequent communication. When keys are selected the server 312 will cache these and, if the wireless communication device 314 provides a session identifier in the client hello message the server 312 will search the cache for this session identifier. According to one exemplary embodiment of the invention, the message contains the above mentioned fields as well as additionally 'buffer memory' field having the length of 32 bits. The field and length of the client hello message can be varied based on the requirements.

In the second step, the server 312 generating a random number 'r' after receiving client hello message, according to one exemplary embodiment of the invention, the size of the random number 'r' can be 256-bit and subsequently the server 312 encrypting a message with the generated random number 'r' (preferably 256-bit random number) using hash function through a pre-shared private key 'k' of the wireless communication device 314 and the server 312 sending the encrypted message {y=Enck (r XoR Hash(Tr_ID))} to the wireless communication device 314.

In the third step, the wireless communication device 314 decrypting the encrypted message by matching hash function [Hash (Tr_ID) XoR Deck(y)] through the pre-shared private key 'k' of the wireless communication device 314 and subsequently the wireless communication device 314 retrieving the random number 'r' (preferably 256-bit random number) after receiving the encrypted message from the sever 312;

In the fourth step, the wireless communication device 314 generating two new random numbers t1 and t2 respectively, (according to one exemplary embodiment of the invention, preferably the range 7 bits), as catalysts to Deterministic Random Sequence Generation (DRSG) process and subsequently the wireless communication device 314 generating two new sequences S1 & S2 from the above said two new random numbers t1 and t2, and the above said retrieved random number "r" using DRSG algorithm {DRSG (r, t1, t2)}, then the wireless communication device 314 while encrypting a message with said two new random numbers t1 & t2 using hash function through a pre-shared key 'k' of the wireless communication device 314, further adding a nonce value for security and then the wireless communication device 314 sending encrypted message {Enck(t1, t2, date, time), Hash (S1 XoR S2), Nonce(S1 XoR S2)} to the Server 312.

In the fifth step, the server 312 decrypting the above said two new random numbers t1 & t2 using the pre-shared key 'k' of the wireless communication device 314, subsequently the server 312 computing a XOR operator of first 384-bit sequence S1 with second 384-bit sequence S2 {S1 XoR S2} using DRSG algorithm {{DRSG (r, t1, t2)} and the server 312 validating the protocol and In the final steps the server 312 sending the response after validating the protocol to the wireless communication device 314. If the response is 'true" then the secure transaction of data process starts between the wireless communication device 314 and the server 312, otherwise, the response is 'false", the communication ends between them.

According to one embodiment of the invention, the wireless communication device 214 generating two new sequences S1 & S2 using DRSG algorithm and the value of above said one random number t1 is less than the value of the second random number t2 which are generated by wireless communication device, further comprising the steps of:

In the first step, DSRG process generating 128 distinct random 64-bit numbers which are used as seed values along with the value of the retrieved random number 'r', optionally the personnel information used as seeds, according to one exemplary embodiment of the invention, the wireless communication device can be mobile, then the personnel information can be Cust_ID, Mobile no, SIM card no, etc.

In the second step, DSRG process applying forward difference operator the value of order (t1 times) of the first random number t1 on a set of seeds and finding a new first sequence S1, In final step, DSRG process repeating the second step for second random number t2 and finding a second new sequence S2.

Before initiating the communication in the above said system 300, initially, the server 312 registers the device and IMEI numbers of the wireless communication device 314 and then distributing customer identity and transaction identity (Cust_ID and Tr_ID) to each wireless communication devices 314 prior to being allowed access to the server 312. According to one exemplary embodiment of the invention, the wireless communication device 314 can be mobile phone, so the server 314 registers mobile and IMEI numbers and distributes customer identity and transaction identity (Cust_ID and Tr_ID) to each mobiles 314 prior to being allowed access to the server 312 and subsequently the server 312 sends 192-bit pre-shared encryption key 'k' using AES-CTR algorithm to the wireless communication device 314 prior to being allowed access to the server 312 and a known Pseudo Random Number Generator (PRNG) which accepts a seed for generating the random numbers.

According to one embodiment of the invention, the hash function is matched, in the above mentioned system and method, in order to maintain a secure communication to avoid phishing and replay attacks and according to another embodiment of the invention, the nonce value is added, in the above mentioned system and method, in order to maintain a secure communication to avoid phishing and replay attacks. Further, hashing and nonce methods are used to avoid Initial Counter Prediction and Time Memory Trade Off attacks.

Advantages of EAP Protocol Based on Random Sequence-2

1. Reply attack is avoided due to random integers generated by the server
2. It is computationally difficult for an attacker to find S1 XoR S2 with the knowledge of t1 and t2 if a client key 'k' is compromised.
3. Using linear operators in this protocol, it is difficult to determine the original sequence having 128 distinct random numbers of each size 64-bits with some personnel information. Therefore, it is difficult for an attacker to tamper the message during transmission. The attacker must settle for a 2-8 chance of success.
4. The proposed protocols are compatible with 2G, 3G or 4G mobile networks.
5. This protocol is lightweight when compared to PKI approach.

Figure 5:
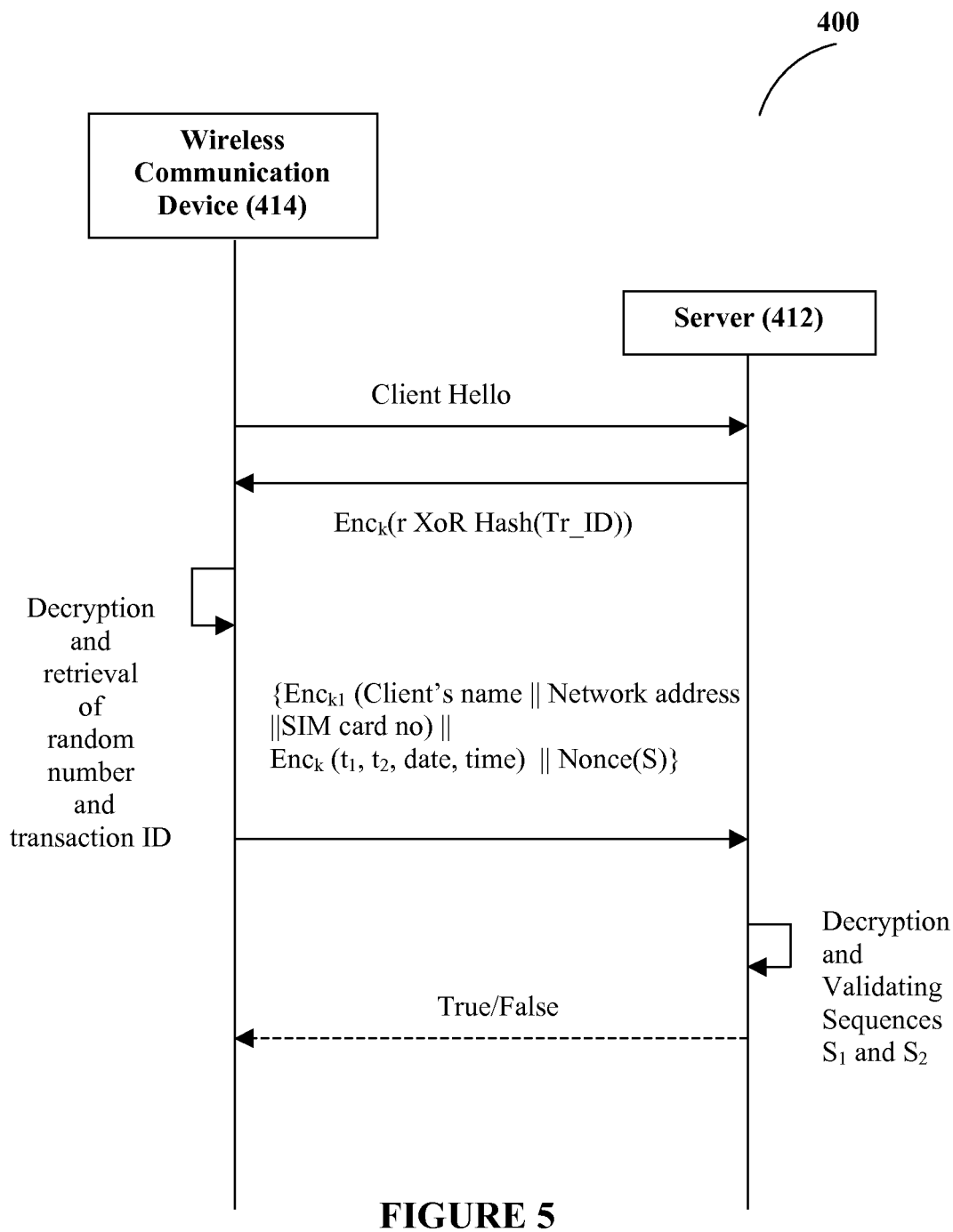
FIG. 5 illustrates the secure transaction of data using EAP Protocol based on Random sequence-3 between server and wireless communication device according to one embodiment of the invention.

FIG. 5 illustrates the secure transaction of data using EAP Protocol based on Random sequence-3 between server and wireless communication device according to one embodiment of the invention. A system 400 comprises a server 412 and a wireless communication device 414 are communicatively coupled with each other via communication network; the communication network can be selected from the group of Wide area network (WAN), Local Area Network (LAN) or Metropolitan Area Networks (MAN), internet, intranet, etc and the wireless communication device 414 can be selected from one of the group of mobile handsets, smart phones, PDAs, cellular phones, or tiny devices and the wireless communication device enabled with 2G, 3G, or 4G networks. According to one exemplary embodiment of the invention, the wireless communication device 414 can be mobile phone.

A method of communication used in the above said system 400 comprising receiving, from at least one wireless communication device 414, a connection attempt to access a server 412; performing an authentication process using lightweight Extensible Authentication Protocol (EAP) based on the random sequences to facilitate the wireless communication device 414 prior to being allowed access to the server 412, wherein the said authentication process comprising the following steps:

In the first step, the wireless communication device 414 initiating the communication by sending client hello message to the server 412, wherein the client hello message includes a list of encryption algorithms that the wireless communication device 414 is prepared to use and some challenge data to be used to authenticate the server 412. The message contains the following fields:

TABLE 3

CLIENT HELLO MESSAGE

| Field | Length |
|---|---|
| The message type (client hello) | 8 bits |
| The SSL version number (currently 2) | 16 bits |
| The length of the cipher list | 16 bits |
| The length of the session identifier | 16 bits |
| The length of the challenge data | 16 bits |
| The cipher list | variable |
| The session identifier | $16 \leq data \leq 32$ bytes |
| The challenge data | variable |

The session identifier is used to match the current request with a previous one, avoiding the need for repeated authenticate and key exchange if two systems have frequent communication. When keys are selected the server 412 will cache these and, if the wireless communication device 414 provides a session identifier in the client hello message the server 412 will search the cache for this session identifier. According to one exemplary embodiment of the invention, the message contains the above mentioned fields as well as additionally 'buffer memory' field having the length of 32 bits. The field and length of the client hello message can be varied based on the requirements.

In the second step, the server 412 generating a random number 'r' after receiving client hello message, according to one exemplary embodiment of the invention, the size of the random number 'r' can be 256-bit and subsequently the server 412 encrypting a message with the generated random number 'r' (preferably 256-bit random number) using hash function through a pre-shared private key 'k' of the wireless communication device 414 and the server 412 sending the encrypted message {y=Enck (r XoR Hash(Tr_ID))} to the wireless communication device 414.

In the third step, the wireless communication device 414 decrypting the encrypted message by matching hash function [Hash (Tr_ID) XoR Deck(y)] through the pre-shared private key 'k' of the wireless communication device 414 and subsequently the wireless communication device 414 retrieving the random number 'r' (preferably 256-bit random number) after receiving the encrypted message from the sever 412.

In the fourth step, the wireless communication device 414 generating two new random numbers t1 and t2 respectively, (according to one exemplary embodiment of the invention, preferably the range 7 bits), as catalysts to Deterministic Random Sequence Generation (DRSG) process and subsequently the wireless communication device 414 generating two new sequences S1 & S2 from the above said two new random numbers t1 and t2, and the above said retrieved random number "r" using DRSG algorithm {DRSG (r, t1, t2)}, then the wireless communication device 414 computing a new resultant sequence S {S=S1 XoR S2 with Nonce(S)} using a XOR operator of first sequence S1 with second sequence S2 further adding nonce value for security, generating a new session key 'k1' (preferably 192-bits) from the generated new resultant sequence S, encrypting a message with the above said two new random numbers t1 & t2 through a pre-shared key 'k' of the wireless communication device 414 and Device Name, Network address through generated new session key 'k1', nonce value for security, date, and/or time of the message and then the wireless communication device 414 sending encrypted message {Enck1 (Client's name||Network address||SIM card no)||Enck(t1, t2, date, time) ||Nonce(S)} to the Server 412.

In the fifth step, the server 412 decryption above said two new random numbers t1 & t2 using pre-shared key 'k' of the wireless communication device 414, subsequently the server 412 computing the new resultant sequence S from the above said two new random numbers t1 & t2, and the above said retrieved random number 'r' using DRSG algorithm {DRSG (r, t1, t2)}, the server 412 finding the new session key 'k1' which helps to decrypt client's personnel information and then the server 412 validating the protocol.

In the final steps the server 412 sending the response after validating the protocol to the wireless communication device 414. If the response is 'true" then the secure transaction of data process starts between the wireless communication device 414 and the server 412, otherwise, the response is 'false", the communication ends between them.

According to one embodiment of the invention, the wireless communication device 414 generating two new sequences S1 & S2 using DRSG algorithm and the value of above said one random number t1 is less than the value of the second random number t2, the said DSRG algorithm/process/method comprising the steps of:

In the first step, DSRG process generating 128 distinct random 64-bit numbers which are used as seed values along with the value of the retrieved random number 'r', optionally the personnel information used as seeds, according to one exemplary embodiment of the invention, the wireless communication device can be mobile, then the personnel information can be Cust_ID, Mobile no, SIM card no, etc.

In the second step, DSRG process applying forward difference operator the value of order (t1 times) of the first random number t1 on a set of seeds and finding a new first sequence S1, In final step, DSRG process repeating the second step for second random number t2 and finding a second new sequence S2.

Before initiating the communication in the above said system 400, initially, the server 412 registers the device and IMEI numbers of the wireless communication device 414 and then distributing customer identity and transaction identity (Cust_ID and Tr_ID) to each wireless communication devices 414 prior to being allowed access to the server 412. According to one exemplary embodiment of the invention, the wireless communication device 414 can be mobile phone, so the server 414 registers mobile and IMEI numbers and distributes customer identity and transaction identity (Cust_ID and Tr_ID) to each mobiles 414 prior to being allowed access to the server 412 and subsequently the server 412 sends 192-bit pre-shared encryption key 'k' using AES-CTR algorithm to the wireless communication device 414 prior to being allowed access to the server 412 and a known Pseudo Random Number Generator (PRNG) which accepts a seed for generating the random numbers.

According to one embodiment of the invention, the hash function is matched, in the above mentioned system and method, in order to maintain a secure communication to avoid phishing and replay attacks and according to another embodiment of the invention, the nonce value is added, in the above mentioned system and method, in order to maintain a secure communication to avoid phishing and replay attacks. Further, hashing and nonce methods are used to avoid Initial Counter Prediction and Time Memory Trade Off attacks.

Advantages of EAP Protocol Based on Random Sequence-3

1. Reply attack is avoided due to random integers generated by the server
2. It is computationally difficult for an attacker to find k1 with the knowledge of t1 and t2 if a client key 'k' is compromised.
3. No hash algorithm is used when client communicates to server.
4. Two cipher texts are transmitted at a cost of one encryption time.

Figure 6:
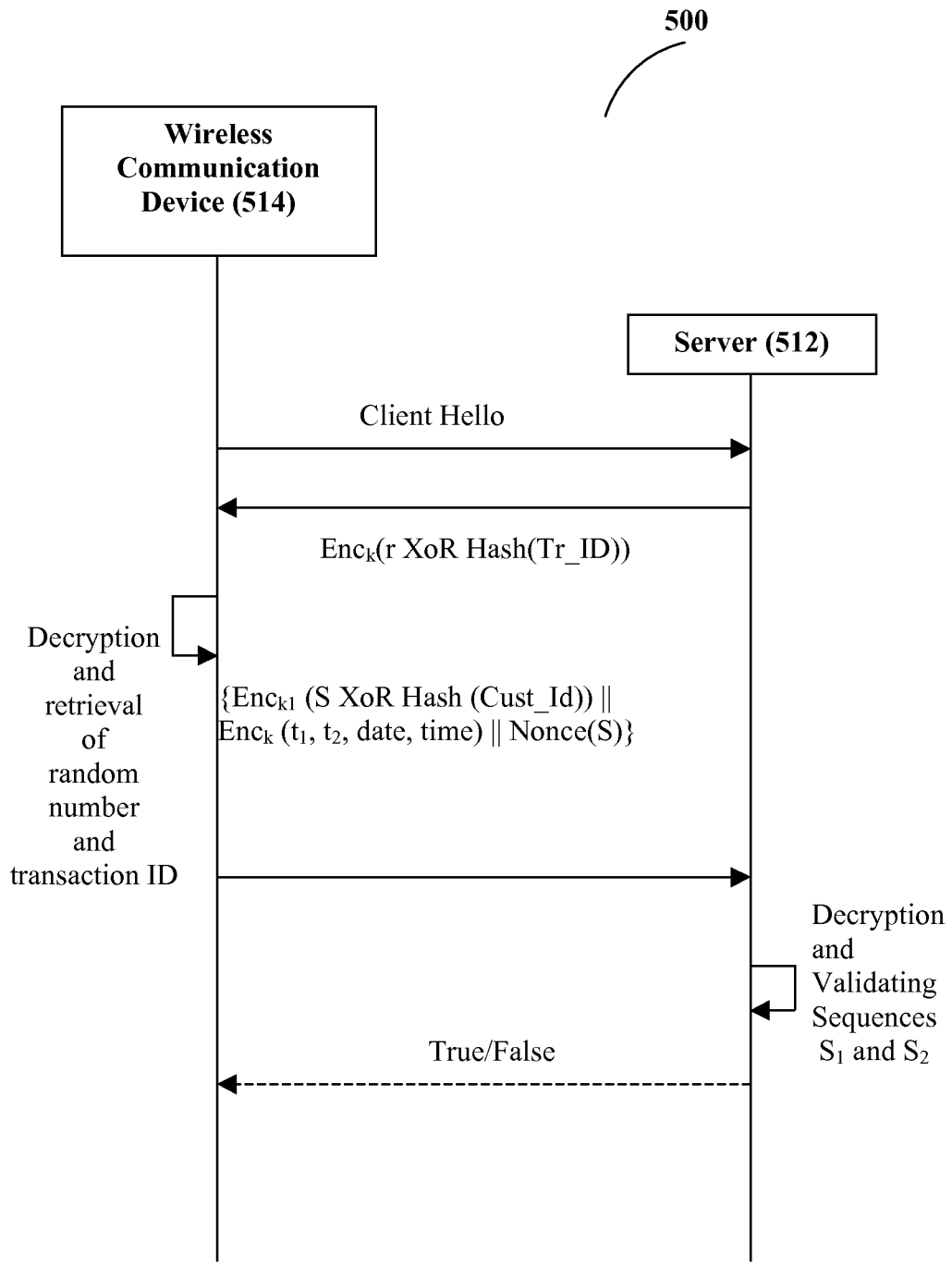
FIG. 6 illustrates the secure transaction of data using EAP Protocol based on Random sequence-4 between server and wireless communication device according to one embodiment of the invention.

FIG. 6 illustrates the secure transaction of data using EAP Protocol based on Random sequence-4 between server and wireless communication device according to one embodiment of the invention. A system 500 comprises a server 512 and a wireless communication device 514 are communicatively coupled with each other via communication network; the communication network can be selected from the group of Wide area network (WAN), Local Area Network (LAN) or Metropolitan Area Networks (MAN), internet, intranet, etc and the wireless communication device 514 can be selected from one of the group of mobile handsets, smart phones, PDAs, cellular phones, or tiny devices and the wireless communication device enabled with 2G, 3G, or 4G networks. According to one exemplary embodiment of the invention, the wireless communication device 514 can be mobile phone.

A method of communication used in the above said system 500 comprising receiving, from at least one wireless communication device 514, a connection attempt to access a server 512; performing an authentication process using lightweight Extensible Authentication Protocol (EAP) based on the random sequences to facilitate the wireless communication device 514 prior to being allowed access to the server 512, wherein the said authentication process comprising the following steps:

In the first step, the wireless communication device 514 initiating the communication by sending client hello message to the server 512, wherein the client hello message includes a list of encryption algorithms that the wireless communication device 514 is prepared to use and some challenge data to be used to authenticate the server 512. The message contains the following fields:

TABLE 4

CLIENT HELLO MESSAGE

| Field | Length |
| --- | --- |
| The message type (client hello) | 8 bits |
| The SSL version number (currently 2) | 16 bits |
| The length of the cipher list | 16 bits |
| The length of the session identifier | 16 bits |
| The length of the challenge data | 16 bits |
| The cipher list | variable |
| The session identifier | $16 \leq$ data $\leq 32$ bytes |
| The challenge data | variable |

The session identifier is used to match the current request with a previous one, avoiding the need for repeated authenticate and key exchange if two systems have frequent communication. When keys are selected the server 512 will cache these and, if the wireless communication device 514 provides a session identifier in the client hello message the server 512 will search the cache for this session identifier. According to one exemplary embodiment of the invention, the message contains the above mentioned fields as well as additionally 'buffer memory' field having the length of 32 bits. The field and length of the client hello message can be varied based on the requirements.

In the second step, the server 512 generating a random number 'r' after receiving client hello message, according to one exemplary embodiment of the invention, the size of the random number 'r' can be 256-bit and subsequently the server 512 encrypting a message with the generated random number 'r' (preferably 256-bit random number) using hash function through a pre-shared private key 'k' of the wireless communication device 514 and the server 512 sending the encrypted message {y=Enck (r XoR Hash(Tr_ID))} to the wireless communication device 514.

In the third step, the wireless communication device 514 decrypting the encrypted message by matching hash function [Hash (Tr_ID) XoR Deck(y)] through the pre-shared private key 'k' of the wireless communication device 514 and subsequently the wireless communication device 514 retrieving the random number 'r' (preferably 256-bit random number) after receiving the encrypted message from the sever 512.

In the fourth step, the wireless communication device 514 generating two new random numbers t1 and t2 respectively, (according to one exemplary embodiment of the invention, preferably the range 7 bits), as catalysts to Deterministic Random Sequence Generation (DRSG) process and subsequently the wireless communication device 514 generating two new sequences S1 & S2 from the above said two new random numbers t1 and t2, and the above said retrieved random number "r" using DRSG algorithm {DRSG (r, t1, t2)}, then the wireless communication device 414 computing a new resultant sequence S {S=S1 XoR S2 with Nonce(S)} using a XOR operator of first sequence S1 with second sequence S2 further adding nonce value for security, generating a new session key 'k1' (preferably 192-bits) from the generated new resultant sequence S, subsequently encrypting a message with the above said two new random numbers t1 & t2 through a pre-shared key 'k' of the wireless communication device 514 and customer ID through generated new session key 'k1', nonce value for security, date, and/or time of the message and then the wireless communication device 514 sending encrypted message {Enck1 (S XoR Hash(Cust_ID)) ||Enck(t1, t2, date, time)||Nonce(S)} to the Server 412.

In the fifth step, the server 512 decryption above said two new random numbers t1 & t2 using pre-shared key 'k' of the wireless communication device 414, subsequently the server 412 computing the new resultant sequence S from the above said two new random numbers t1 & t2, and the above said retrieved random number 'r' using DRSG algorithm {DRSG (r, t1, t2)}, the server 412 finding the new session key 'k1' which helps to decrypt Customer ID by matching hash function {S XoR Hash(Cust_ID)} and then the server 412 validating the protocol.

In the final step, the server 512 sending the response after validating the protocol to the wireless communication device 514. If the response is 'true" then the secure transaction of data process starts between the wireless communication device 514 and the server 512, otherwise, the response is 'false", the communication ends between them.

According to one embodiment of the invention, the wireless communication device 514 generating two new sequences S1 & S2 using DRSG algorithm and the value of above said one random number t1 is less than the value of the second random number t2, the said DSRG algorithm/process/method comprising the steps of:

In the first step, DSRG process generating 128 distinct random 64-bit numbers which are used as seed values along with the value of the retrieved random number 'r', optionally the personnel information used as seeds, according to one exemplary embodiment of the invention, the wireless communication device can be mobile, then the personnel information can be Cust_ID, Mobile no, SIM card no, etc.

In the second step, DSRG process applying forward difference operator the value of order (t1 times) of the first random number t1 on a set of seeds and finding a new first sequence S1, In final step, DSRG process repeating the second step for second random number t2 and finding a second new sequence S2.

Before initiating the communication in the above said system 400, initially, the server 512 registers the device and IMEI numbers of the wireless communication device 514 and then distributing customer identity and transaction identity (Cust_ID and Tr_ID) to each wireless communication devices 514 prior to being allowed access to the server 512. According to one exemplary embodiment of the invention, the wireless communication device 514 can be mobile phone, so the server 514 registers mobile and IMEI numbers and distributes customer identity and transaction identity (Cust_ID and Tr_ID) to each mobiles 514 prior to being allowed access to the server 512 and subsequently the server 512 sends 192-bit pre-shared encryption key 'k' using AES-CTR algorithm to the wireless communication device 514 prior to being allowed access to the server 512 and a known Pseudo Random Number Generator (PRNG) which accepts a seed for generating the random numbers.

According to one embodiment of the invention, the hash function is matched, in the above mentioned system and method, in order to maintain a secure communication to avoid phishing and replay attacks and according to another embodiment of the invention, the nonce value is added, in the above mentioned system and method, in order to maintain a secure communication to avoid phishing and replay attacks. Further, hashing and nonce methods are used to avoid Initial Counter Prediction and Time Memory Trade Off attacks.

Advantages of EAP Protocol Based on Random Sequence-4
1. Reply attack is avoided due to random integers generated by the server
2. It is computationally difficult for an attacker to find another key k1 with the knowledge of t1 and t2 if a client key 'k' is compromised.
3. Hash algorithm is used when client communicates to server
4. Two cipher texts are transmitted at a cost of one encryption time.

Strengths of EAP Protocol Based on Random Sequence-(1/2/3/4)
1) From Base station to GPRS core network via Network subsystems, the EAP Protocols based on Random sequence-(1/2/3/4) work in speedy manner due to no exchange of public key certificates between the nodes.
2) Using linear operators in EAP protocols, it is difficult to determine the original sequence having 128 distinct random numbers of each size 64-bits. Therefore, it is difficult for an attacker to tamper the message during transmission. The attacker must settle for a $(1/128) \times 2-64 = 2-71$ chance of success.
3) The proposed protocols are compatible to 2G, 3G or 4G mobile networks.
4) For encryption, AES-CTR-192 bit/3-DES algorithm is used. It is stronger than A5 algorithm.
5) No public key set up or certification infrastructure is required in the EAP protocols.
6) EAPs encrypt Node address, Base station, etc using AES-CTR-192 bit/3-DES algorithm so that IMSI catcher attack is not feasible.
7) No key agreement between different domains and key expiration are not there in the EAP protocols.
8) EAP protocols provide security to application layers.
9) EAP protocols are suitable for WLANs, and WMANs and are better than the existing EAPs which are vulnerable to a number of attacks—dictionary attack, plain text attack, chosen plain text attack, even man in the middle attack.

The invention is described in the example given below which is provided only to illustrate the invention and therefore should not be construed to limit the scope of the invention.

Requirements: EAP Application Environment is as mentioned below:
a) Software Environment

TABLE 5

| Operating System | Windows XP/2003 SP3 |
|---|---|
| Software/Tools | WTK2.5.2, Log4Net | b) Hardware Environment

TABLE 6

| Workstation Client | Windows XP with SP3 |
|---|---|
| Test Server | 4 GB RAM, Intel Core 2 vPro 160 GB HDD, E6550 as processor |
| Mobile | J2ME enabled Mobile with GPRS connectivity. |

Initial Test Set-up
a) EAP Client:
  1) Basically EAP client will Installed in Mobile devices (for e.g. Nokia N79, E75, 5800-ExpressMusic, 6210 Navigator).
  2) It is a J2ME Code which will do the encryption & decryption of data.
  3) It will contact the server and communicate through a secure channel.
b) EAP Server:
  1) A server application built using .NET framework, which is used for decryption & encryption of data.

2) Decrypts the Client request and send the response back in encrypted format.

Figure 7:
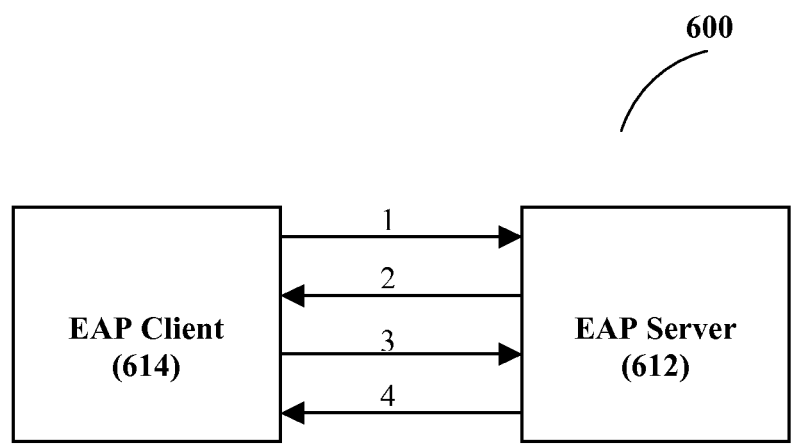
FIG. 7 illustrates flow diagram with performance by using lightweight EAP Protocols for secure transaction of data between wireless communication device and server.

EAP Application Flow Diagram with performance. FIG. 7 illustrates flow diagram with performance 600 by using lightweight EAP Protocols for secure transaction of data between wireless communication device and server. In the first step, client 614 initiating the communication by sending client hello message to the server 612 {1→ClientInitiate( )-request}, in the second step, the server 612 sending hexadecimal sequence as a response after receiving the client hello message from the client 614 {2→Hexa decimal sequence (response)}, in the third step, the client 614 sending request message using the EAP protocol to server 612 for initiating secure transaction of data between them {3→EAP Protocol( ) request} and in the fourth step, the server 612 sending the response after validating the protocol to the client 614 {4→true/false(response)} and in the final step, If the response is 'true" then the secure transaction of data process starts between the client and the server, otherwise, the response is 'false", the communication ends between them.

Test Results. The invention has been tested in Nokia handset series N79, E75, 5800 and 6210 support EAP Client module. As per the performance, Nokia has done 'EAP flow' and the server checks the authentication response in <0.5 ms. This is a remarkable performance compared to certificate based transactions where the authentication response from server end takes >1 sec.

Example 1

The below table shows the comparison analysis of SSL with EAP Protocols:

TABLE 7

| S. No | SSL versions | EAP Protocols |
|---|---|---|
| 1 | SSL 2.0 unnecessarily weakens the authentication keys to 40 bits | 192 bit keys are used for authentication purpose |
| 2 | Mostly suitable for wired applications | Suitable to wired and wireless applications |
| 3 | SSL produces a weak MAC construction | No MAC is used |
| 4 | It is noticed that examination of ciphertext lengths can reveal information about URL requests in SSL or SSL-encrypted Web traffic due to weak encryption algorithms. | Strong encryption algorithms are used |
| 5 | SSL uses CBC mode. So, Cut-and-paste attack is possible. | CTR mode avoids this attack |
| 6 | SSL includes padding data but not the length of the padding in the MAC input, so an active attacker could manipulate the cleartext padding length field to compromise message integrity. | No padding is done |
| 7 | The SSL 3.0 handshake protocol contains a design flaw. A server can send short-lived public key parameters, signed under its long-term certified signing key, in the server key exchange message. Several key-exchange algorithms are supported, including ephemeral RSA and Diffie-Hellman public keys. Unfortunately, the signature on the short-lived parameters does not protect the field which specifies which type of key-exchange algorithm is in use. | No certificate concept is used |
| 8 | Version rollback attacks are possible | Not yet raised. |
| 9 | SSL has a design flaw in the server key exchange message. The standard key-exchange algorithms bind the signature on the short-lived cryptographic parameters to the connection by hashing with server and client nonces, but due to | No separate key-exchange algorithm is used. |

TABLE 7-continued

| S. No | SSL versions | EAP Protocols |
|---|---|---|
|  | some oversight, anonymous key-exchanges do not perform this binding. Therefore, if one can convince a server to perform on anonymous key-exchange, then one will be able to spoof the server in all future sessions that use anonymous key exchanges. |  |
| 10 | SSL uses timestamp to avoid replay attack, spoofing and transmission errors. | EAP uses scrambled timestamp to avoid these attacks. |

Security Details of EAP Protocols of the Invention

1) The default session will be canceled if any communication link is lost between client and server. In this case, the application closes automatically upon connection loss or non availability in both ends and then one need to restart a new connection. The application removes the generated values of previous session from memory.
2) The default session will be canceled due to power failure in client's mobile. Then there is no communication signal from client side. Hence, the application deletes the generated values of the present session in both ends when the power goes down from a mobile.
3) The default session will be canceled due to communication signal failure in client's mobile. Hence the application deletes the generated values of the present session in both ends.
4) EAP is suitable to 2G, 3G or 4G mobiles which have minimum configurations: GPS(JSR 179)(Optional), GPRS, Security API (JSR 177) and Http connection.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

A system and method for a set of Extensible Authentication Protocols (EAPs) based on the Random sequences that can serve Confidentiality, Authentication, Authorization and Accounting (CAAA) issues at an affordable cost in accordance with this invention described above finds a number of applications in Information Security and mobile communication. Some specific areas where the invention can be applied are as follows: Smart phones, Personnel Digital Assistant (PDA), Mobile banking, Wireless devices, Set-Top Box, Remote control systems, and Alarm systems.

The preceding description has been presented with reference to various embodiments of the invention. Persons skilled in the art and technology to which this invention pertains will appreciate that alterations and changes in the described process and methods of operation, use of the software and hardware other than those described can be practiced without meaningfully departing from the principle, spirit and scope of this invention.

I claim:

1. A method of authenticating a wireless communication device, comprising the steps of:
transmitting to a communication device a first message from a server;
generating a first random number at the server;
generating a first encrypted signal at the server using a second message and the first random number;
transmitting the first encrypted signal from the server to the communication device;
decrypting the first encrypted signal at the communication device;

retrieving the first random number at the communication device;
generating at least two new random numbers at the communication device;
generating a second signal at the communication device using the two new random numbers and the first random number;
encrypting the second signal at the communication device;
transmitting the second signal from the communication device to the server;
decrypting the second signal at the server using a Deterministic Random Sequence Generation (DSRG) process;
validating the second signal using a hash value comparison at the server;
generating a response based on the hash value comparison at the server; and
transmitting the response to the communication device by the server.

2. The method of claim 1, wherein the first encrypted signal is generated using a hash function through a pre-shard private key of the communication device.

3. The method of claim 1, wherein encrypting the second signal includes matching a hash function through a first session key of the communication device.

4. The method of claim 3, further comprising the steps of:
generating at the communication device 128 distinct random 64-bit numbers to be used as seed values along with the first random number;
computing a first sequence at the communication device by applying a first forward difference operator value in the order of the first random number on the seed values;
computing a second sequence at the communication device by applying a second forward difference operator value in the order of the two second random numbers of the seed values;
generating a resulting 192-bit number at the communication device; and
computing a second session key at the communication device using the resulting 192-bit number and a pre-shared encryption key.

5. The method of claim 1, wherein generating the first encrypted signal includes adding a nonce value to the first encrypted signal.

6. The method of claim 1, wherein decrypting the first encrypted signal includes computing an XOR operator of a first 384-bit sequence with a second 384-bit sequence using the DSRG process.

7. The method of claim 1, further comprising registering at the server at least one of a device number and an IMEI number of the communication device.

8. The method of claim 1, further comprising distributing by the server at least one of a customer identity and a transaction identity to the communication device.

9. The method of claim 1, further comprising transmitting a 192-bit pre-shared encryption key from the server to the communication device using either an AES-CTR algorithm or an AES-CBC algorithm.

10. The method of claim 1, further comprising maintaining a secure communication channel between the server and the communication device using a hash function and a nonce value.

11. A system of authenticating a wireless communication device, comprising:
a server configured to generate a first random number;
a first encryption module at the server configured to generate a first encrypted signal using the first random number;
a communication device configured to receive the first encrypted signal from the server;
a decryption module at the communication device configured to decrypt the first encrypted signal and retrieve the first random number;
a random number generator at the communication device configured to generate at least two new random numbers;
a second encryption module at the communication device configured to generate a second signal using the two new random numbers and the first random number;
a transceiver at the communication device configured to transmit the second signal from the communication device to the server;
a second decryption module at the server configured to decrypt the second signal using a Deterministic Random Sequence Generation (DSRG) process;
a validation module at the server configured to validate the second signal using a hash value comparison; and
a response generating module configured to:
generate a response based on the hash value comparison at the server; and
transmit the response to the communication device by the server.

12. The system of claim 11, wherein the first encryption module is configured to generate the first encrypted signal using a hash function through a pre-shared private key of the communication device.

13. The system of claim 11, wherein the second encryption module is configured to match a hash function through a first session key of the communication device.

14. The system of claim 11, wherein the communication device is further configured to generate 128 distinct random 64-bit numbers be used as seed values along with the first random number, compute a first sequence at by applying a first forward difference operator value in the order of the first random number on the seed values, compute a second sequence at by applying a second forward difference operator value in the order of the two second random numbers of the seed values, generate a resulting 192-bit number, and compute a second session key using the resulting 192-bit number and a pre-shared encryption key.

15. The system of claim 11, wherein the first encryption module is configured to add a nonce value to the first encrypted signal.

16. The system of claim 11, wherein the first decryption module is configured to compute an XOR operator of a first 384-bit sequence with a second 384-bit sequence using the DSRG process.

17. The system of claim 11, wherein the server is configured to register at least one of a device number and an IMEI number of the communication device.

18. The system of claim 11, wherein the server is configured to transmit at least one of a customer identity and a transaction identity to the communication device.

19. The system of claim 11, wherein the server is configured to transmit a 192-bit pre-shared encryption key to the communication device using either an AES-CTR algorithm or an AES-CBC algorithm.

20. The system of claim 11, wherein the communication device is a wireless communication device enabled to operate using a 2G, 3G, or 4G communication protocol.

* * * * *